Patented Sept. 17, 1929.

1,728,216

UNITED STATES PATENT OFFICE

KARL SCHIRMACHER AND LUDWIG VAN ZÜTPHEN, OF HOCHST-ON-THE-MAIN, GERMANY, ASSIGNORS TO GENERAL ANILINE WORKS, INC., OF NEW YORK, N. Y., A CORPORATION OF DELAWARE

ANTHRAQUINONE NITRILES AND PROCESS FOR MAKING THE SAME

No Drawing. Application filed November 6, 1926, Serial No. 146,843, and in Germany November 13, 1925.

Our present invention relates to the preparation of anthraquinone nitriles.

We have found that nitriles of the anthraquinone series are obtained in an easy manner by treating halogen anthraquinones in the heat with cuprous cyanide in presence of fatty or aliphatic-aromatic nitriles. If the process is carried out in presence of fatty nitriles of low boiling point, for instance with acetonitrile, the reaction may be performed in sealed vessels at an elevated temperature, whereas in the case of aliphatic-aromatic nitriles of high boiling point, such, as for instance benzylcyanide, the boiling temperature will be sufficient to complete the reaction.

The reaction takes place very quickly, particularly when aliphatic-aromatic nitriles of high boiling point are used; it is generally complete when the mass is dissolved. On cooling or on addition of, for instance, alcohol, complex compounds separate the constitution of which is not yet known with certainty. They contain, besides the new nitrile, copper and the aliphatic-aromatic nitrile. If treated with diluted nitric acid in the heat, the complex compound is decomposed, the copper passes into solution, the fatty or aliphatic-aromatic nitrile distills over with water-vapour and the anthraquinone nitriles remain as a solid mass which may be easily crystallized by redissolution.

By our above described new process it is possible to obtain by a very simple and easy reaction and with a very good yield a great variety of anthraquinone nitriles which could be produced only with great difficulty or not at all by the hitherto known processes, for instance by those described in German Patents No. 271,790 and No. 275,517. Thus, it is possible, for instance in the 1.4.5.8-tetrachloranthraquinone to replace one chlorine atom after the other by a cyano residue according to the duration of the reaction, so that finally 1.4.5.8-anthraquinonetetra-nitrile can be obtained.

The nitriles containable by our new process give throughout green vats and by saponification they are transformed into the corresponding carboxylic acids. They constitute valuable intermediate products for the manufacture of dyestuffs. Thus there may, for instance be produced from 1.4-dichloranthraquinone the 1.4-anthraquinonedinitrile, from 1.5-dichloranthraquinone the 1.5-anthraquinonedinitrile, from 1-chloranthraquinone the 1-anthraquinonenitrile, from 1.4.5.8-tetrachloranthraquinone the 1.4-5-tricyan-8-chloranthraquinone or the 1.4.5.8-anthraquinonetetra-nitrile.

The following examples serve to illustrate our invention, but are not intended to limit it thereto; all parts being by weight:

1. 27 parts of 1.5-dichloranthraquinone are heated, while stirring, with three to five times the quantity of benzylcyanide and 18 parts of cuprous cyanide until reaction takes place, which occurs with evolution of heat. The reaction is soon terminated generally with complete dissolution of the mass. On cooling, the copper-containing nitrile separates in a crystalline form, whereupon it is isolated by filtration or the whole reaction liquid is freed from benzylcyanide by means of steam. The residual copper-containing nitrile is then treated in the heat with diluted nitric acid (of about simple or double normal strength) and then filtered by suction while hot. In this manner there is obtained in an almost quantitative yield the copper-free 1.5-anthraquinonedinitrile which may be recrystallized from nitrobenzene. The compound of the following formula:

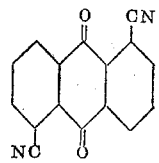

has no melting point, but decomposes, while fusing, at 380°. It dissolves in the vat to a green solution, its solution in sulfuric acid being yellow. By saponification with sulfuric acid and sodium nitrite by one of the known methods, the 1.5-anthraquinone dicarboxylic acid is obtained.

2. If the benzylcyanide as used in Example 1 is replaced by an equivalent quantity of acetonitrile and if the reaction is performed in a sealed vessel at 230–240° C. in about 1–2 hours, the same copper-containing cyanide is obtained which separates when the mass has cooled. The product of the following formula:

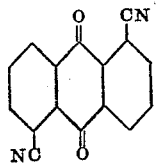

is obtained by working up the reaction product in the manner indicated in Example 1.

3. 24 parts of 1-chloranthraquinone are heated with 3 to 5 times the quantity of benzylcyanide and 9 parts of cuprous cyanide until the mixture is completely dissolved, which occurs in a short time. The solution is allowed to cool, the benzylcyanide is removed by means of steam and the residual mass is heated, as indicated in Example 1, with dilute nitric acid and then filtered by suction. The residual mass is free from copper and gives with an almost quantitive yield a product which proves to be 1-cyananthraquinone. After recrystallization from chlorobenzene, the nitrile melts at 245–247° C. On saponification this nitrile of the following formula:

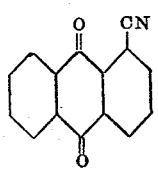

is converted into the anthraquinone-α-carboxylic acid.

4. 17,3 parts of 1.4.5.8-tetrachloranthraquinone and 18 parts of cuprous chloride are heated with 90 parts of benzylcyanide to 200–210° C., until the mixture is completely dissolved. The solution is allowed to cool, the reaction mixture is diluted with alcohol and the whole is warmed on the water bath. On cooling, a copper-containing substance precipitates which is isolated by filtration and digested for some time in the heat with diluted nitric acid. The copper salts pass into solution and there is left an oily body which after separation is triturated. By this operation the product solidifies and is then filtered by suction and purified by sublimation. The resulting product of the following formula:

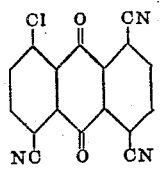

is a yellow compound which has no melting point, but gives, like all nitriles, a green vat. Analysis of the product shows that it constitutes a 1.4.5-tricyan-8-chloranthraquinone.

5. 54 parts of 1.4-dichloranthraquinone are heated with 500 parts of benzylcyanide and 72 parts of cuprous cyanide until the mass is dissolved and this solution is further heated to boiling for a short time. The mass is then allowed to cool, filtered by suction and the precipitate is washed with alcohol. The precipitate is digested for some time with diluted nitric acid at 100° C., filtered hot and washed with water. The product of the following formula:

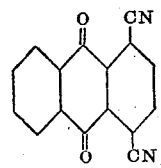

is free from halogen, melts after re-dissolution from nitrobenzene at 389–390° C., dissolves in concentrated sulfuric acid to a red solution and gives a bluish-green vat. Analysis of the product shows that it constitutes 1.4-anthraquinonedinitrile.

6. If the quantity of benzycyanide used according to Example 4 is considerably increased, for instance 10 to 25 times, and if the heating operation is continued for a prolonger time, and the further working up of the product carried out as indicated in Example 4, the 1.4.5.8-anthraquinonetetracyanide of the following formula:

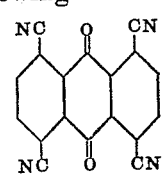

is obtained which has no melting point and possesses similar properties as those of the product described in Example 4, being however free from halogen.

If in the manner above set forth are treated for instance 1.3-dibrom-2-aminoanthraquinone, 1.2-dichloranthraquinone, 1.3-dichloranthraquinone, 1.2.3.4-tetrachloranthraquinone etc., the corresponding nitriles are obtained, some of which are already known.

7. 38 parts of 1-amino-2.4-dibromanthraquinone are boiled for 3 minutes, while well stirring, with 10 parts of cuprous cyanide and 280 parts of benzylcyanide. The body which crystallizes after cooling is filtered by suction and then treated with diluted nitric acid and water vapour.

The reddish-yellow product thus obtained with a yield of 95% has the following formula:

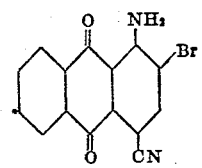

and is free from copper and melts at 275° C., forming a vat, which when seen in transparent light, is bluish-red and when seen in a reflecting light greenish. It can be recrystallized from glacial acetic acid and its analysis shows that the product constitutes 1-amino-2-brom-4-anthraquinone nitrile.

In the following claims we intend to comprise under the term "nitriles" the aliphatic and aliphatic-aromatic nitriles.

We claim:

1. The process for the preparation of anthraquinone nitriles, which consists in heating a halogen anthraquinone in presence of a nitrile with cuprous cyanide.

2. The process for the preparation of anthraquinone nitriles, which consists in heating a halogen anthraquinone in presence of a nitrile of a low boiling point with cuprous cyanide and with the application of pressure.

3. The process for the preparation of 1.4-anthraquinone dinitrile, which consists in heating 1.4-dichloranthraquinone in presence of a nitrile with cuprous cyanide.

4. The process for the preparation of 1.4-anthraquinone dinitrile. which consists in heating 1.4-dichloranthraquinone in presence of nitrile of a low boiling point with cuprous cyanide and with the application of pressure.

5. The process for the preparation of 1.4-anthraquinone dinitrile, which consists in heating 1.4-dichloranthraquinone in presence of benzylcyanide with cuprous cyanide.

6. As new products, anthraquinone nitriles of the following composition:

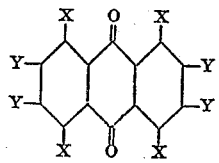

wherein X or Y stand for hydrogen or any other substituent and at least two X's stand for cyano residues.

7. As a new product, 1.4-anthraquinone dinitrile of the formula:

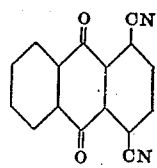

melting at 389–390° C., dissolving in concentrated sulfuric acid to a red solution and giving a bluish-green vat.

In testimony whereof, we affix our signatures.

KARL SCHIRMACHER.
LUDWIG van ZÜTPHEN.